United States Patent [19]
Ohara

[11] Patent Number: 5,128,751
[45] Date of Patent: Jul. 7, 1992

[54] IMAGE SENSING DEVICE ARRANGED TO PERFORM A WHITE COMPRESSION PROCESS

[75] Inventor: Eiji Ohara, Kanagawa, Japan

[73] Assignee: Canon Kabushiki Kaisha, Tokyo, Japan

[21] Appl. No.: 469,301

[22] Filed: Jan. 24, 1990

[30] Foreign Application Priority Data

Feb. 1, 1989 [JP] Japan .................................. 1-24420

[51] Int. Cl.⁵ .......................... H04N 9/04; H04N 9/73
[52] U.S. Cl. ......................................... 358/29; 358/32
[58] Field of Search ............... 358/29 C, 32, 164, 170, 358/228, 229

[56] References Cited

U.S. PATENT DOCUMENTS

| | | | |
|---|---|---|---|
| 4,202,009 | 5/1980 | Ushiyama | 358/32 |
| 4,365,272 | 12/1982 | Nagai | 358/228 |
| 4,651,210 | 3/1987 | Olson | 358/32 |
| 4,700,219 | 10/1987 | Tanaka | 358/29 C |
| 4,714,966 | 12/1987 | Saito | 358/228 |
| 4,734,762 | 3/1988 | Aoki | 358/29 C |

FOREIGN PATENT DOCUMENTS

| | | | |
|---|---|---|---|
| 142693 | 8/1983 | Japan | 358/29 C |
| 189391 | 9/1985 | Japan | 358/29 C |
| 192185 | 9/1985 | Japan | 358/29 C |

Primary Examiner—Tommy P. Chin
Attorney, Agent, or Firm—Robin, Blecker, Daley & Driscoll

[57] ABSTRACT

In an image sensing device which performs a white compressing process before performing an automatic gain adjusting action on an image signal, a white compression circuit is arranged to have a white compressing characteristic which is variable in association with the automatic gain adjustment; and the gain of an A/D converter which is provided for A/D converting the output of the white compression circuit is arranged to be adjustable.

12 Claims, 2 Drawing Sheets

IMAGE SENSING DEVICE ARRANGED TO PERFORM A WHITE COMPRESSION PROCESS

BACKGROUND OF THE INVENTION

1. Field of the Invention

This invention relates to an image sensing device having a white compression circuit.

2. Description of the Related Art

The dynamic range of a video signal obtained by an image sensing device is generally larger by a plurality of times than that of an ordinary standard TV signal. Therefore, for the purpose of securing an adequate dynamic range or S/N ratio, it has been practiced to carry out a white compression (knee) process within an analog or digital signal processing system. Various methods for attaining this purpose have been known.

The conventional white compression process has been generally carried out at a fixed point after a white balance adjusting process. However, for example, it is conceivable to carry out the white balance adjustment by varying the reference voltages of the two ends of the ladder resistance of an A/D converter. In such a case, the white compression process must be carried out before the white balance adjustment process (in the case of R, G and B signals, for example) for the purpose of matching the input signal with the inside of the dynamic range of the A/D converter. Then, if the operating point of the white compression process is set beforehand at a level within a range desired for adequate white balance adjustment, the white compression characteristic becomes non-linear at a high luminance part within this range. The non-linear characteristic then results in a white compression process effected only for the R or B signal among other input signals according to the levels of input color signals. In such a case, therefore, the white balance adjustment cannot be accurately accomplished.

SUMMARY OF THE INVENTION

This invention is directed to the solution of the above-stated problem of the prior art. It is therefore, an object of the invention to provide an image sensing device which is capable of accurately performing white balance control irrespectively of the color temperature of the image sensing object by setting the operating point of the white compression process at an optimum value according to the color temperature.

To attain this object, an embodiment of this invention is provided with a white compression circuit which is arranged to have a variable characteristic and to have the variable characteristic controlled in association with automatic gain adjustment which is performed on a video signal after the white compression circuit.

The above-stated arrangement of the embodiment optimizes the level of an input signal for the automatic gain control to ensure an improved S/N ratio. Further, in a case where white balance adjustment is to be accomplished by the automatic gain control, the white balance adjustment can be accurately accomplished.

The above and other objects and features of the invention will become apparent from the following detailed description of an embodiment thereof taken in connection with the accompanying drawings.

DETAILED DESCRIPTION OF THE PREFERRED EMBODIMENT

Figure 1:
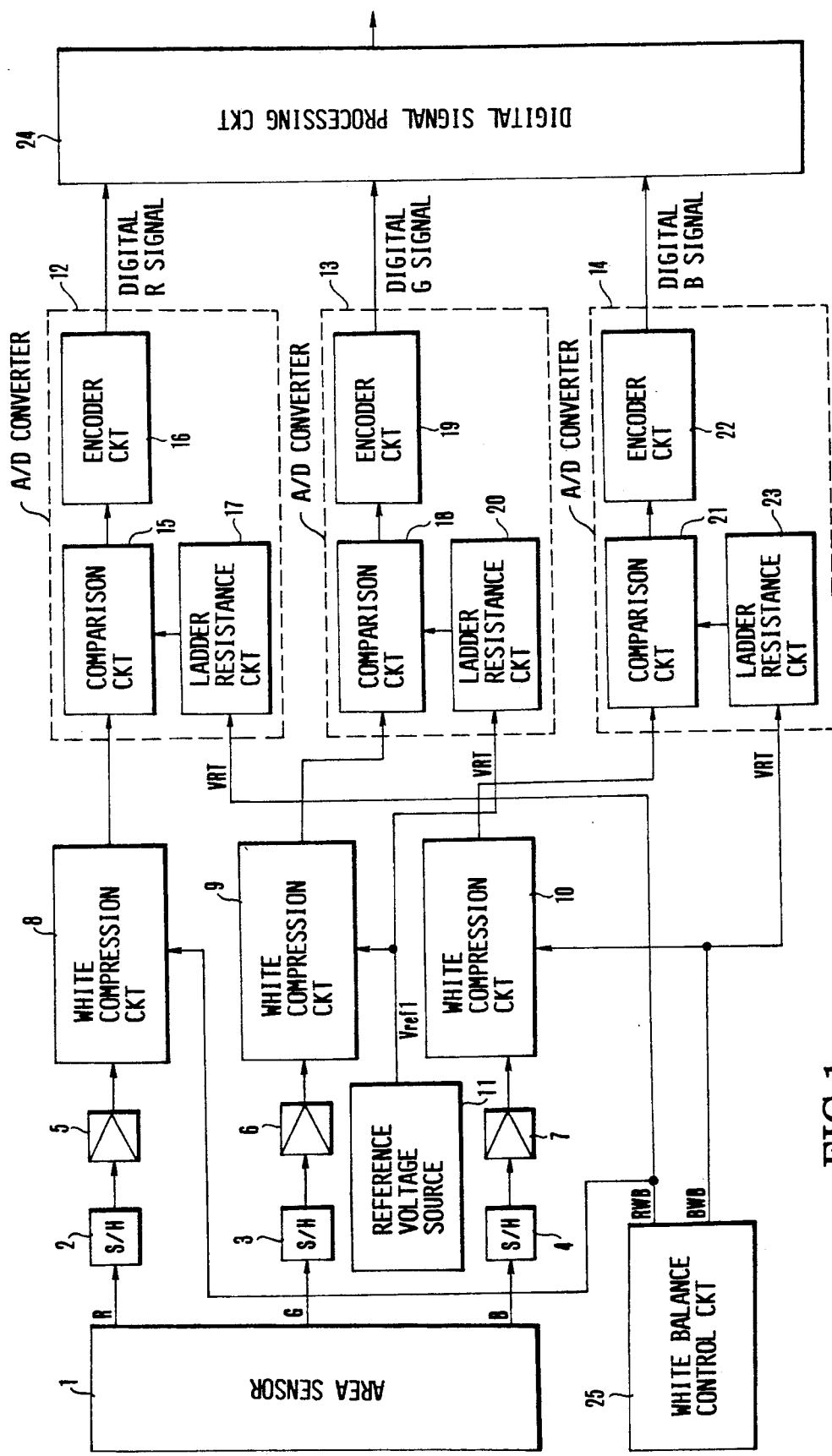
FIG. 1 is a circuit diagram showing the arrangement of an embodiment of this invention.
Figure 2:
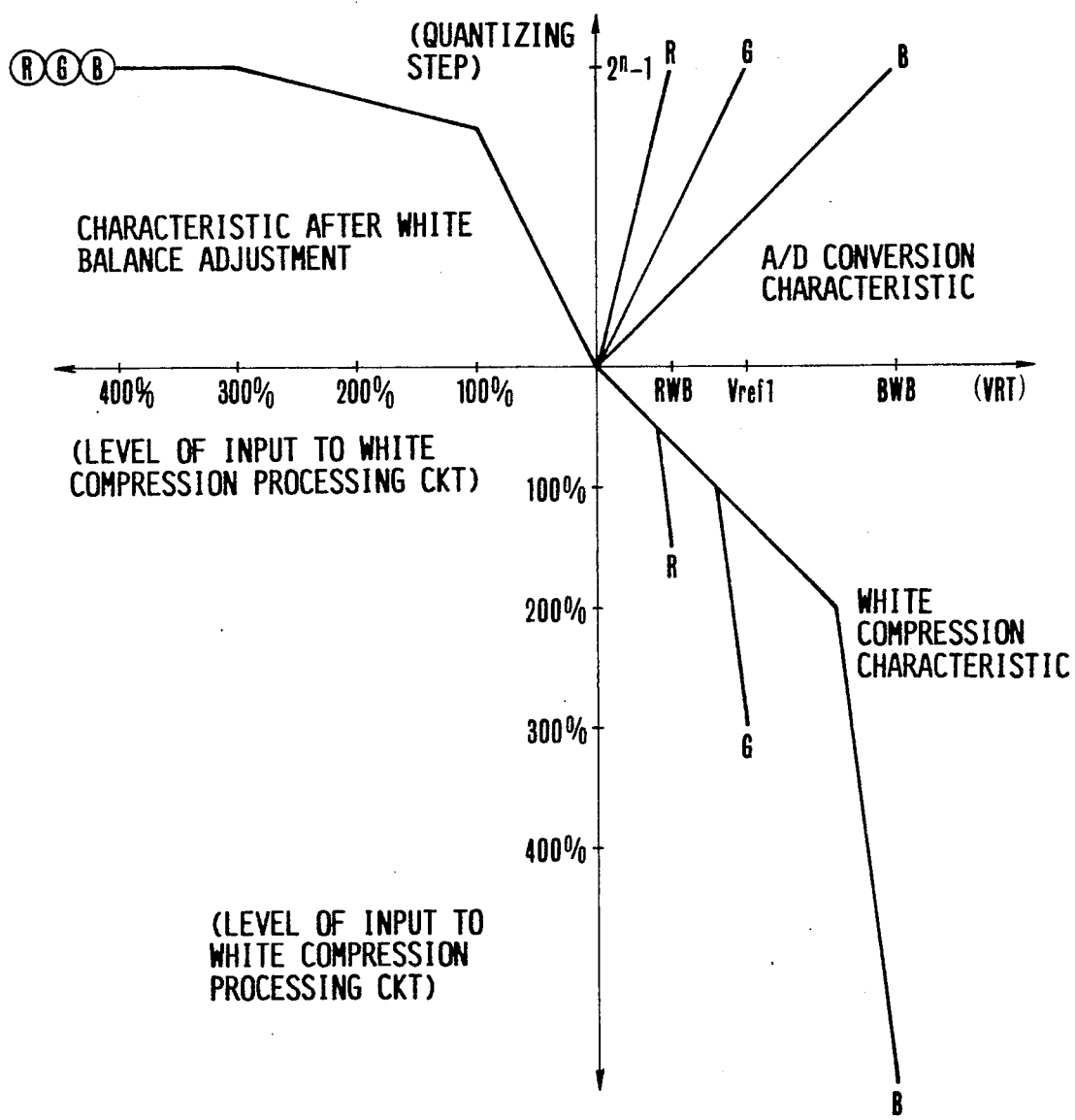
FIG. 2 is a graph showing the characteristics of essential circuits arranged according to the invention.

FIG. 1 shows in a circuit diagram an embodiment of the invention. Referring to FIG. 1, an area sensor 1 is arranged to photo-electric convert an incident image. Sample-and-hold circuits 2, 3 and 4 are arranged to sample and hold video signals of colors R (red), G (green) and B (blue) read out from the area sensor 1. Reference numerals 5, 6 and 7 denote amplifying circuits. White compression circuits 8, 9 and 10 are arranged to have their characteristics variable by external voltages. A reference voltage source 11 is arranged to form a reference voltage Vrefl which is used for controlling the white compression characteristic of a G channel (for the G signal) and the gain of an analog-to-digital (hereinafter referred to as A/D) converter 13 for the G channel. A/D converters 12, 13 and 14 are arranged to convert the video signal outputs of the white compression circuits 8, 9 and 10 into digital video signals respectively. A digital signal processing circuit 24 is arranged to perform a digital processing action on the digital video signals converted by the A/D converters. Each of the A/D converters 12, 13 and 14 consists of a comparison circuit 15, 18 or 21, an encoder circuit 16, 19 or 22 and a ladder resistance circuit 17, 20 or 23. The gain of each A/D converter 12, 13 or 14 is variable by changing the reference voltage VRT of the ladder resistance circuit 17, 20 or 23 by external inputs. A white balance control circuit 25 is arranged to detect a ratio between the outputs of an R sensor and a B sensor which are arranged to sense light obtained, for example, through a diffusing plate and to produce white balance control voltages RWB and BWB for controlling the white balance according to the output ratio. Further, FIG. 2 shows the characteristics of the essential circuits arranged according to this invention. In other words, FIG. 2 shows in a diagram the level of each channel obtained in a case where the color temperature of the object the image of which is to be sensed is high.

The embodiment operates as follows: The video signals of colors R, G and B which are read out from the area sensor 1 are subjected to a pretreatment which is carried out by the circuits 2 to 7 respectively. After the pretreatment, these signals are supplied to the white compression circuits 8, 9 and 10 to undergo a white compression process which is performed in a manner as shown in FIG. 2. The white compressing operation point of each of these circuits 8, 9 and 10 is arranged to be variable by means of an external voltage. The white compression characteristics for the R and B channels are controlled by voltages RWB and BWB output from the white balance control circuit 25. Meanwhile the G channel is controlled in a fixed manner by the reference voltage Vrefl of the fixed reference voltage source 11.

For example, in the event of an object of a high color temperature (when a level relation among the R, G and B signals is "G/2=R<G<B=2G", for example), the white balance control circuit 25 performs control in such a way as to obtain a relation which can be expressed as follows:

$$\frac{Vrefl}{2} = RWB < Vrefl < BWB = 2\, Vrefl$$

As a result, white compressing operation points are set in proportion to the input levels of the R, G and B signals.

The outputs of the white compression circuits 8, 9 and 10 are A/D converted by the A/D converters 12, 13 and 14. The gains of these A/D converters are arranged to be variable by changing a reference voltage VRT applied to the ladder resistance circuits 17, 20 and 23 which are included respectively in the A/D converters. More specifically, with a quantizing step assumed to be 255 CNT for an input signal level of 1 V when the reference voltage VRT is 1 (V), for example, the quantizing step becomes 255 CNT for an input signal level of 0.5 V if the reference voltage VRT is lowered to 0.5 (V). Then, this increases the gain of the A/D converter by two times. This gain control action is performed on the R and B channels by using the voltages RWB and BWB. Therefore, considering the above-stated color temperature with reference to the characteristic shown in FIG. 2, since there obtains the relation of "Vrefl/2=RWB<Vrefl<BWB =2 Vrefl", the gain of the R channel is increased to a value which is twice as high as that of the G channel while that of the B channel is reduced to one half. As a result of this adjustment, the levels of the R, G and B digital signals obtained through the A/D conversion become equal to each other and the white balance adjustment process is completed. Further, in this instance, the white balance is perfectly obtained also for a high luminance part of the signal above the white compressing operation point. (While the A/D converter is shown as having a linear characteristic in FIG. 2, the A/D converter may be arranged to have a non-linear characteristic). Each digital video signal encoded by the encoder circuit 16, 19 or 22 after completion of the white compression and white balance adjustment processes is processed by the digital signal processing circuit 24 and is digital-to-analog (D/A) converted (not shown) before it is output, for example, to a monitor or the like.

As described in the foregoing, the operating characteristic of the white compression processing circuit which is provided for the purpose of obtaining an adequate dynamic range of the A/D converter and an adequate S/N ratio is arranged to be adjustable in association with the automatic gain adjustment such as white balance adjustment. This arrangement not only gives an improved S/N ratio but also ensures an adequate white balance adjustment for the high luminance part of the signal. The embodiment thus gives a good picture quality.

What is claimed is:

1. An image sensing device arranged to perform a white compressing process on a video signal before automatic gain adjustment is performed on said video signal, comprising:

a white compression circuit coupled to receive said video signal, having a white compressing characteristic arranged to be variable in association with said automatic gain adjustment; and a gain control circuit coupled to said white compression circuit, for performing gain control over an output of said white compression circuit.

2. An image sensing apparatus according to claim 1, wherein said gain control circuit includes an analog-to-digital converter.

3. An image sensing device comprising:
    a) white compression means for performing a white compressing process on an input video signal;
    b) gain control means for performing gain control over an output of said white compression means; and
    c) control means for setting a white compressing characteristic of said white compression means and a gain control characteristic of said gain control means in association with each other.

4. A device according to claim 3, wherein said gain control means is an analog-to-digital converter.

5. A device according to claim 3, wherein said control means is a white balance control circuit which is arranged to form a white balance control signal according to a color temperature of an object.

6. A device according to claim 3, wherein said input video signal is composed of a plurality of color signals.

7. A device according to claim 3, wherein said input video signal is an output of an image sensing means which is arranged to convert image light of an object into an electrical signal.

8. An image sensing apparatus arranged to perform a white compression process on an input video signal and to perform white balanced control by controlling a gain of the white-compressed video signal, comprising:

a control means for producing a control signal for the white balance control; and a white compression circuit for varying a white compression characteristic on the basis of said control signal including an analog-to-digital converter having a ladder resistance circuit and wherein white balance control is accomplished by varying a reference voltage of said ladder resistance circuit in accordance with said control signal.

9. A device according to claim 3, further including an analog-to-digital converter and wherein said white balance control is accomplished by adjusting a gain of said analog-to-digital converter.

10. A device according to claim 8, wherein said control means is a white balance control circuit which is arranged to form a white balance control signal according to a color temperature of an object.

11. A device according to claim 8, wherein said input video signal is composed of a plurality of color signals.

12. A device according to claim 8, further including an image sensing means which is arranged to convert image light of an object into an electrical signal and wherein said input video signal is an output of said image sensing means.

* * * * *